United States Patent [19]

Okazaki

[11] Patent Number: 5,292,188
[45] Date of Patent: Mar. 8, 1994

[54] ANTI-SPIN BRAKING SYSTEM FOR MAINTAINING DIRECTIONAL STABILITY OF A VEHICLE

[75] Inventor: Haruki Okazaki, Hiroshima, Japan
[73] Assignee: Mazda Motor Corporation, Hiroshima, Japan
[21] Appl. No.: 943,869
[22] Filed: Sep. 11, 1992
[30] Foreign Application Priority Data
Sep. 13, 1991 [JP] Japan .................. 3-234362
[51] Int. Cl.⁵ .................................... B60T 8/58
[52] U.S. Cl. ........................... 303/111; 303/100; 303/109
[58] Field of Search ............... 300/100, 93, 92, 104, 300/103, 105, 106, 111, 113 AP, 113.5, 109; 364/426.02

[56] References Cited
U.S. PATENT DOCUMENTS 4,042,059 8/1977 Bertolasi ..................... 303/100
4,521,856 6/1985 Phelps et al. ................. 303/94
5,063,514 11/1991 Headley et al. ............... 303/106

FOREIGN PATENT DOCUMENTS 60-1061 1/1985 Japan .

Primary Examiner—Matthew C. Graham
Attorney, Agent, or Firm—Sixbey, Friedman, Leedom & Ferguson

[57] ABSTRACT

An anti-skid brake system for a vehicle increases and reduces the braking pressure applied to each wheel in response to depression of the brake pedal so that the wheel speed of the wheel falls at a predetermined deceleration or a predetermined slip ratio according to the wheel speed and a pseudo vehicle speed. It is determined that the vehicle is spinning when a state where the braking pressure to none of the wheels is increased keeps for a predetermined time. The braking pressures applied to all the wheels is increased when it is determined that the vehicle is spinning.

9 Claims, 4 Drawing Sheets

ANTI-SPIN BRAKING SYSTEM FOR MAINTAINING DIRECTIONAL STABILITY OF A VEHICLE

BACKGROUND OF THE INVENTION

1. Field of the Invention

This invention relates to an anti-skid brake system for a vehicle.

2. Description of the Prior Art

In an anti-skid brake system for a vehicle, the braking pressures applied to the wheels of the vehicle in response to depression of the brake pedal are controlled so that the wheel speeds are reduced at a target deceleration or at a target slip ratio, thereby preventing lock and skid of the wheels and stopping the vehicle in a short distance with a directional stability.

There have been proposed various anti-skid brake systems. For example, in the anti-skid brake system disclosed in Japanese Unexamined Patent Publication No. 60(1985)-1061, the braking pressures are reduced as the steering angle increases, thereby improving both the braking efficiency and the driving stability.

When the brake pedal is pushed down while the steering wheel is being turned, the rear wheels can skid to make the vehicle spin. When the vehicle spins, the wheel speeds lower at relatively large deceleration rates. Since the anti-skid brake system is generally arranged to control the braking pressure applied to each wheel so that the deceleration rate of the wheel speed is, for instance, in the range of 0.3 G to 1.0 G in order to prevent lock of the wheel, the braking pressure is reduced when the deceleration rate of the wheel speed is larger than the range.

Even after the spin of the vehicle ends and the vehicle begins to run straight ahead, the wheel speed keeps low relative to a pseudo vehicle speed on the basis of which whether the wheel tends lock is determined, and the braking pressure is kept reduced or fixed. Accordingly, the vehicle keeps running for a while after it begins to run straight ahead.

SUMMARY OF THE INVENTION

In view of the foregoing observations and description, the primary object of the present invention is to provide an anti-skid brake system which can stop the vehicle in a short time when the vehicle spins.

Another object of the present invention is to provide an anti-skid brake system which can stop the vehicle immediately after the vehicle stops spinning and begins to run straight ahead.

The anti-skid brake system in accordance with the present invention is provided with a spin determination means which determines that the vehicle is spinning and a pressure increasing means which increases the braking pressures applied to all the brakes when the spin determination means determines that the vehicle is spinning. The spin determination means determines that the vehicle is spinning when the braking pressures applied to the respective wheels in response to depression of the brake pedal are controlled and the braking pressures to all the wheels are kept reduced or fixed for a predetermined time.

The braking pressure applied to each wheel is kept reduced or fixed when the deceleration of the wheel or the slip ratio of the wheel is large. When the vehicle is spinning, a state where the braking pressures to all the wheels are kept reduced or fixed occurs. Though such a state can occur when all the wheels run on a low friction coefficient road such as frozen road, the state continues for a relatively long time (e.g., 0.5 seconds) only when the vehicle is spinning.

In one embodiment of the present invention, the pressure increasing means increases the braking pressures to the wheels when the difference between the largest and the smallest of the wheel speeds becomes not smaller than a predetermined value (e.g., 3 Km/h) after the spin determination means determines that the vehicle is spinning. While the vehicle is spinning, the difference between the largest and the smallest of the wheel speeds is large and when the vehicle stops spinning, the difference becomes small. Accordingly, with this arrangement, the braking pressures to the wheels can be surely increased after the end of spinning. When the braking pressures are increased before the end of the spinning, the spinning can be enhanced.

BRIEF DESCRIPTION OF THE INVENTION

FIG. 1 is a schematic view showing an anti-skid brake system in accordance with an embodiment of the present invention, FIG. 2 is a view showing the relation between the slip ratio and the friction coefficient between the road surface and the wheel and the relation between the slip ratio and the lateral drag coefficient, FIG. 3 is a time chart for illustrating the normal anti-skid control, FIG. 4 is a flow chart for illustrating change of the pseudo vehicle speed during spinning of the vehicle, and FIG. 5 is a time chart showing change in the wheel speed and the pseudo vehicle speed during spinning of the vehicle.

DESCRIPTION OF THE PREFERRED EMBODIMENT

Figure 1:
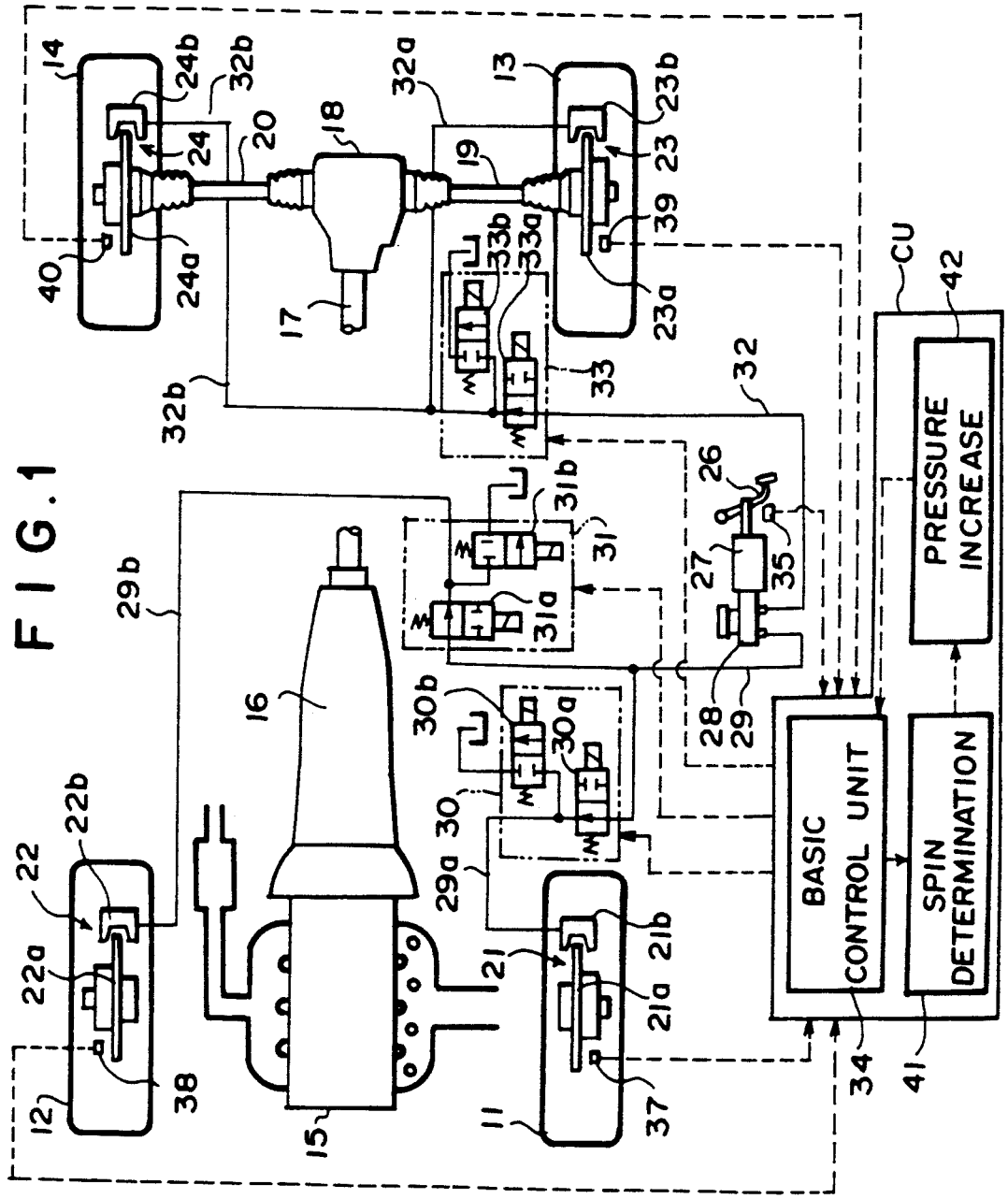

In FIG. 1, a vehicle has left and right front wheels 11 and 12 (driven wheels) and left and right rear wheels 13 and 14 (driving wheels). The output torque of an engine 15 is transmitted to the rear wheels 13 and 14 by way of an automatic transmission 16, a propeller shaft 17, a differential 18 and left and right driving shafts 19 and 20.

The wheels 11 to 14 are provided with brakes 21 to 24 comprising disks 21a to 24a and calipers 21b to 24b.

The brake system for operating the brakes 21 to 24 comprises a brake pedal 26, a booster 27 and a master cylinder 28. A front brake line 29 which extends from the master cylinder 28 branches into left and right front brake lines 29a and 29b which are respectively connected to the calipers 21b and 22b of the brakes 21 and 22. A first valve unit 30 comprising an electro-magnetic on-off valve 30a and an electro-magnetic relief valve 30b is provided in the left front brake line 29a and a second valve unit 31 comprising an electro-magnetic on-off valve 31a and an electro-magnetic relief valve 31b is provided in the right front brake line 29b.

A rear brake line 32 which extends from the master cylinder 28 is provided with a third valve unit 33 comprising an electro-magnetic on-off valve 33a and an electro-magnetic relief valve 33b. The rear brake line 32 branches into left and right rear brake lines 32a and 32b, downstream of the third valve unit 33, which are respectively connected to the calipers 23b and 24b of the brakes 23 and 24.

That is, the brake system of this embodiment has a first channel which controls the braking pressure to the brake 21 of the left front wheel 11 by the first valve unit 30, a second channel which controls the braking pressure to the brake 22 of the right front wheel 12 by the second valve unit 31 and a third channel which controls the braking pressure to the brakes 23 and 24 of the left and right rear wheels 13 and 14 by the third valve unit 33. The first to third channels are controlled independently from each other.

The brake system is further provided with a control unit CU having a basic control unit 34 which controls the first to third channels and sets a pseudo vehicle speed (to be apparent later), a spin determination means 41 which determines whether the vehicle is spinning and a pressure increasing means 42 which increases the braking pressure applied to the brakes. The control unit CU may comprise a microcomputer.

The basic control unit 34 receives a brake signal from a brake sensor 35 which represents whether the brake pedal 26 has been depressed, and wheel speed signals from wheel speed sensors 37 to 40 which respectively detect the wheel speeds of the left and right front wheels 11 and 12 and the left and right rear wheels 13 and 14, and controls the first to third channels independently from each other. The basic control unit 34 opens and closes the on-off valves 30a, 31a and 33a and the relief valves 30b, 31b and 33b of the first to third valve units 30, 31 and 33 on the basis of a pseudo vehicle speed and the wheel speeds of the wheels 11 to 14, thereby controlling the braking pressures applied to the respective wheels 11 to 14. The brake fluid discharged from the relief valves 30b, 31b and 33b is returned to a reservoir 28a of the master cylinder 28.

The pseudo vehicle speed $V_r$ is set according to the wheel speeds as a temporary vehicle speed since the vehicle speed cannot be precisely detected while the wheels are slipping. That is, in this embodiment, the pseudo vehicle speed $V_r$ is normally set to be the largest of the wheel speeds $V_w$ of the front and rear wheels 11 to 14 (the maximum wheel speed $MaxV_w$), and when the deceleration of the maximum wheel speed $MaxV_w$ exceeds a predetermined reference deceleration $D_r$ which is determined as a value from 0.3 G to 1.2 G according to the friction coefficient of the road surface, the pseudo vehicle speed $V_r$ is set to be the value obtained by subtracting the predetermined reference deceleration $D_r$ from the last pseudo vehicle speed $V_r$ as represented by the following formula.

$$V_r \leftarrow V_r - D_r$$

wherein $D_r = 0.3$ G$\Delta t \sim 1.2$ G$\Delta t$, $\Delta t$ is the sampling cycle of the control unit (e.g., 7 ms) and G is the acceleration of gravity.

The basic control unit 34 compares the acceleration or deceleration of the wheel or the slip of the wheel with various threshold values and selects one of phase-0, phase-I, phase-II, phase-III and phase IV. When phase-0 is selected, the anti-skid control is not effected. When one of phase-I to phaseIV is selected, the anti-skid control is effected. In phase-I, the braking pressure is reduced, in phase-II, the braking pressure is fixed to the reduced value, in phase-III, the braking pressure is rapidly increased from the value fixed in phase-II, and in phase IV, the braking pressure is slowly increased after rapidly increased in phase-III. The phase is selected in each channel independently from the other channels, and the basic control unit 34 outputs, to the first to third valve units 30, 31 and 33, control signals according to the selected phases.

The control unit sets the following threshold values for each channels independently from the other channels.

Figure 2:
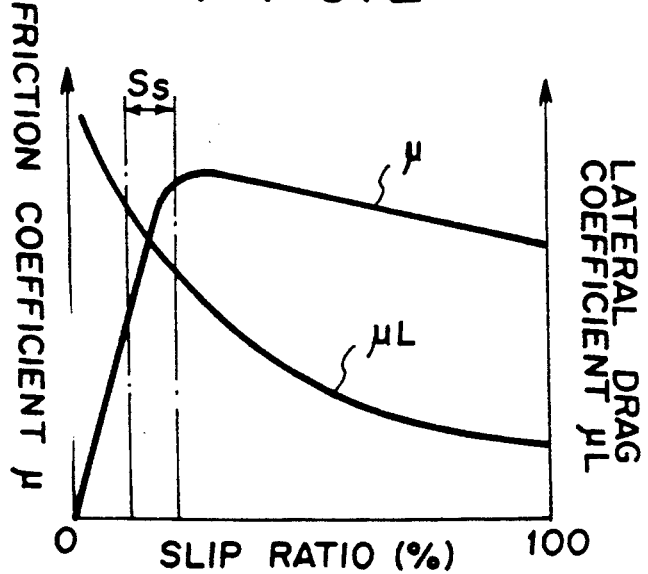

1) first wheel speed deceleration threshold value $G_1$—for determining shift from phase-0 to phase-I
2) second wheel speed deceleration threshold value $G_2$—for determining shift from phase-1 to phase-II
3) first slip ratio threshold value $S_1$—for determining shift from phase-II to phase-III
4) wheel speed acceleration threshold value $G_3$—for determining shift from phase-III to phase-IV
5) second slip ratio threshold value $S_2$—for determining shift from phase-IV to phase-I The threshold values are set so that the friction coefficient $\mu$ between the road surface and the wheel can be maximized without excessively lowering the lateral drag coefficient $\mu L$ as shown in FIG. 2, i.e., so that the friction coefficient $\mu$ and the lateral drag coefficient $\mu L$ fall in the range Ss. That is, when the friction coefficient $\mu$ between the road surface and the wheel is high, a high braking efficiency can be obtained and when the lateral drag coefficient $\mu L$ is high, the running stability during cornering or the driving performance is better. However, as can be understood from FIG. 2, both the friction coefficient $\mu$ between the road surface and the wheel and the lateral drag coefficient $\mu L$ cannot be highest. Accordingly, in the normal anti-skid control, the threshold values are set so that they consist with each other.

The friction coefficient of the road surface is determined to be high while the anti-skid control is not being effected, and after the anti-skid control is initiated, the friction coefficient of the road surface is determined according to the acceleration and deceleration of the wheel speed. That is, when the deceleration is large and the acceleration is small, the friction coefficient is determined to be low, when the deceleration is small and the acceleration is large, the friction coefficient is determined to be high, and otherwise the friction coefficient is determined to be middle.

The deceleration and acceleration of the wheel speed are obtained by dividing the difference between the present value and the last value of the wheel speed by the sampling cycle $\Delta t$ and converting the result to acceleration of gravity. The lower of the left rear wheel speed and the right rear wheel speed is adopted as the rear wheel speed. The slip ratio is calculated according to the following formula.

slip ratio=(1-wheel speed/pseudo vehicle speed)×100

Figure 3:
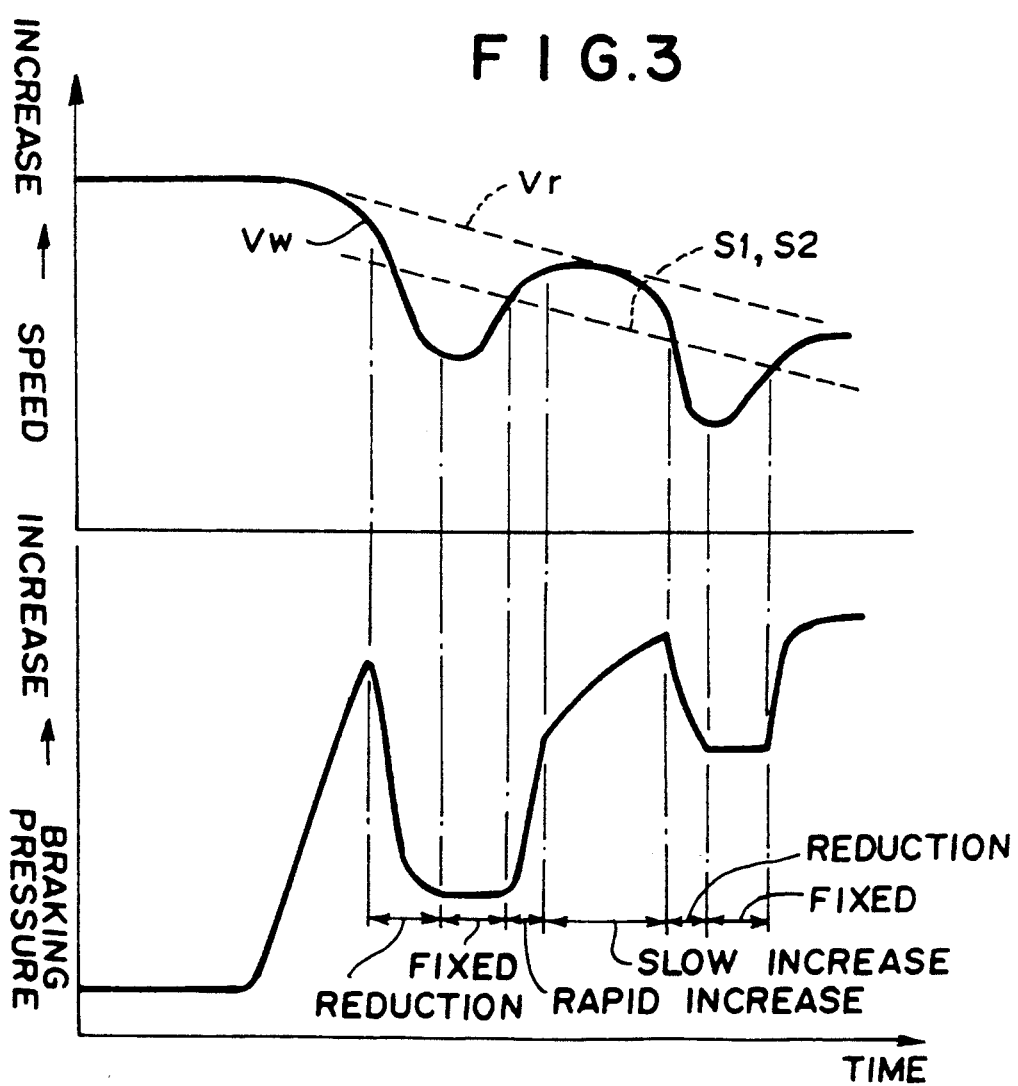

The basic control unit 34 normally controls the braking pressure in the manner shown in FIG. 3.

That is, when the brake pedal 26 is depressed while the vehicle is cruising, the braking pressure produced by the master cylinder 28 increases and the wheel speed is reduced. When the deceleration of the wheel speed exceeds the first wheel speed deceleration threshold value $G_1$, the basic control unit 34 selects phase-I and begins the anti-skid control, that is, the braking pressure is reduced in a predetermined manner. When the deceleration of the wheel speed becomes smaller than the second wheel speed deceleration threshold value $G_2$, the basic control unit 34 selects phase-II and fixes the braking pressure at the value at that time. When the slip ratio is reduced in response to fixing of the braking pressure and becomes smaller than the first slip ratio threshold value S1, the basic control unit 34 selects phase-III and rapidly increases the braking pressure. When the acceleration of the wheel speed decreases as a result of the rapid increase of the braking pressure and becomes not larger than the wheel speed acceleration threshold value G3, the basic control unit 34 selects phase-IV and slowly increases the braking pressure. When the slip ratio exceeds the second slip ratio threshold value S2 while the braking pressure is slowly increased, the basic control unit 34 selects phase-I again.

In this manner, the basic control unit 34 increases and reduces the braking pressure for the first to third channels independently from each other and prevents locking or skid of each wheel, thereby stopping the vehicle in a short distance with a directional stability.

The spin determination means 41 determines that the vehicle is spinning when the basic control unit 34 keeps selecting phase-I or phase-II for all the channels for a predetermined time T1 (e.g., 0.5 seconds), that is, when a state where the braking pressure to none of the wheels is increased continues for the predetermined time.

When the spin determination 41 has determined that the vehicle is spinning and at the same time, the difference between the maximum wheel speed MaxVw and the minimum wheel speed MinVw becomes not smaller than a predetermined value ΔVo (e.g., 3 Km/h), the pressure increasing means 42 increases the braking pressure. In this particular embodiment, the pressure increasing means 42 increases the braking pressure by causing the basic control unit 34 to change the pseudo vehicle speed Vr to the maximum wheel speed MaxVw at that time. Since the wheel speed falls at a large deceleration when the vehicle begins to spin, the maximum wheel speed MaxVw has exceeded the reference deceleration Dr and the pseudo vehicle speed Vr has been set to the value obtained by subtracting the reference deceleration Dr from the last maximum wheel speed MaxVw as described above. Accordingly, the pseudo vehicle speed Vr is higher than the maximum wheel speed MaxVw at that time which is substantially equal to 0 at the end of spin. When the pseudo vehicle speed Vr is changed to the maximum wheel speed MaxVw at that time, the slip ratio as calculated according to the aforesaid formula becomes smaller than the first slip ratio threshold value S1, and the basic control unit 34 selects phase-III and rapidly increases the braking pressure.

Figure 4:
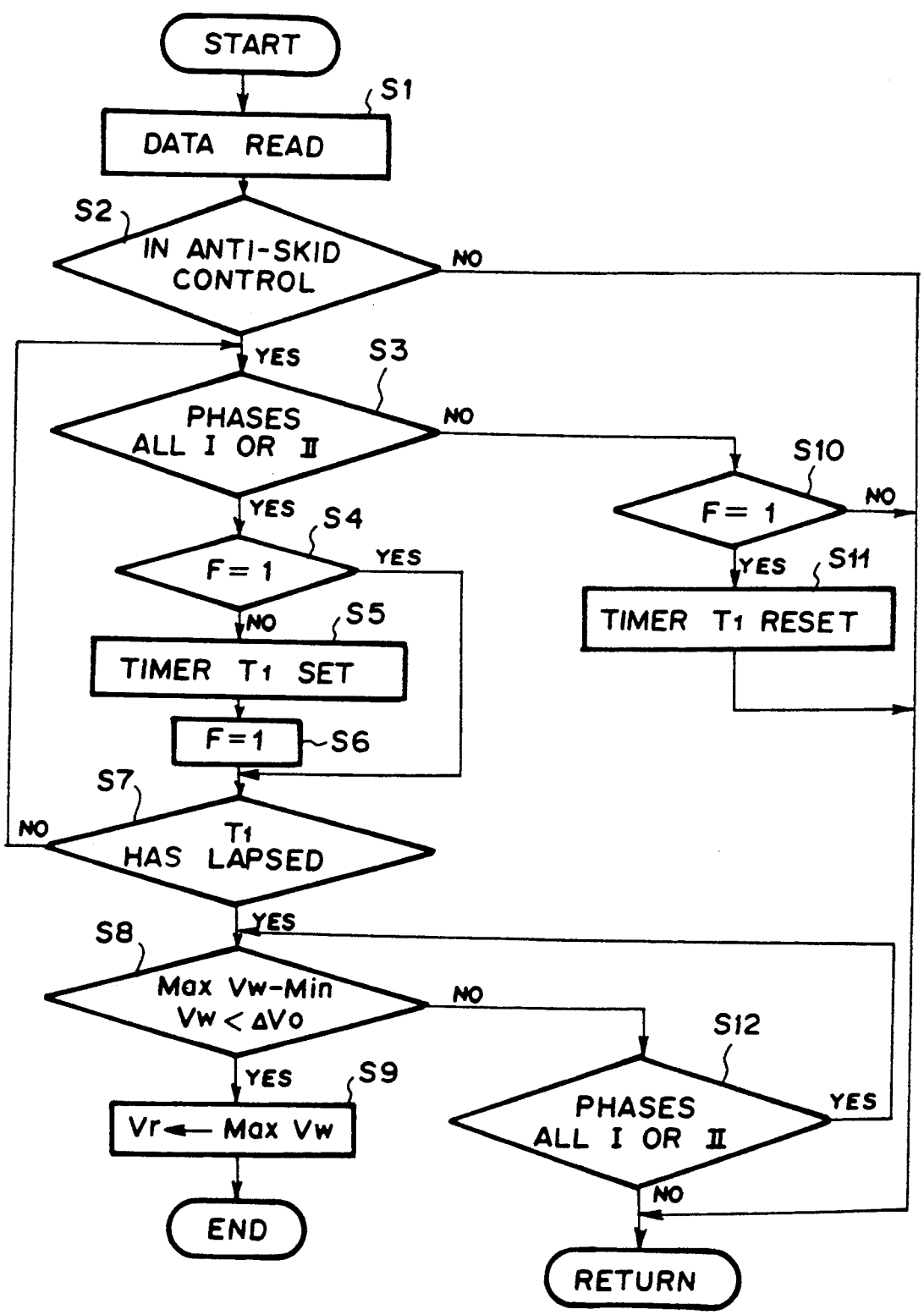

FIG. 4 shows a flow chart for illustrating an example of the procedure by which the control unit CU detects occurrence of spin and changes the pseudo vehicle speed Vr.

Figure 5:
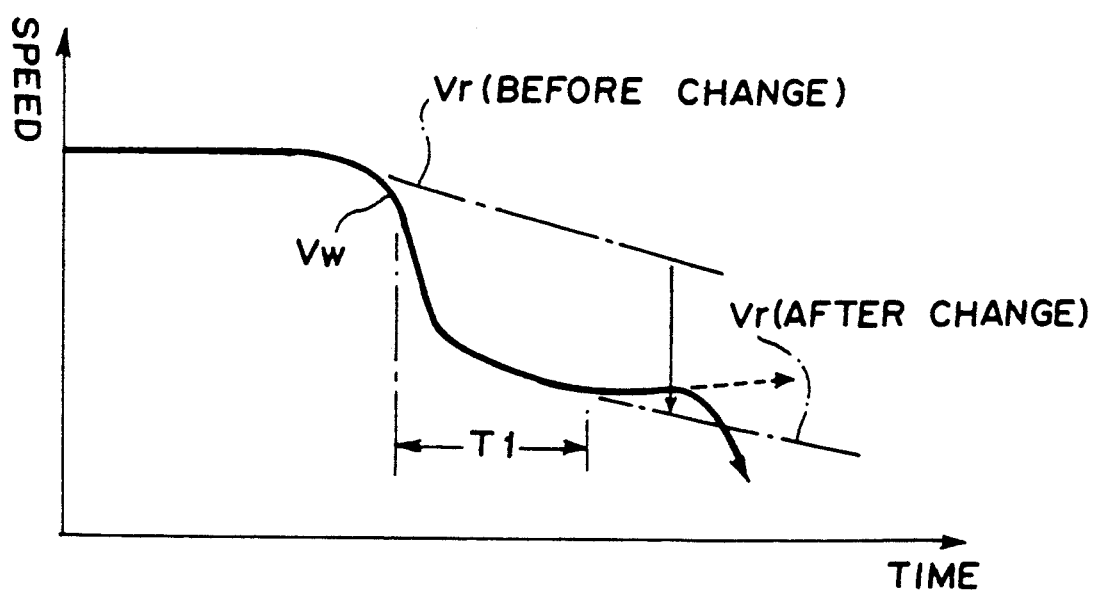

The control unit CU determines whether the anti-skid control is being effected after reading various kinds of data. (steps S1 and S2) When it is determined that the anti-skid control is being effected, the control unit CU determines in step S3 whether the phases for the first to third channels are all phase-I or phase-II. When it is determined that the phases for the first to third channels are all phase-I or phase-II, the control unit CU watches whether the state keeps for the predetermined time T1. (steps S4 to S7) In steps S4 and S6, F denotes a flag which is set to 1 when the phases for the first to third channels are all phase-I or phase-II. When the state has kept for the predetermined time T1, the control unit CU determines whether the difference between the maximum wheel speed MaxVw and the minimum wheel speed MinVw is not smaller than the predetermined value ΔVo. (step S8) When it is determined that the difference between the maximum wheel speed MaxVw and the minimum wheel speed MinVw is not smaller than the predetermined value ΔVo, the control unit CU changes the pseudo vehicle speed Vr to the maximum wheel speed MaxVw at that time as shown in FIG. 5. (step S9) When the pseudo vehicle speed Vr is changed to the maximum wheel speed MaxVw at that time, the slip ratio as calculated according to the aforesaid formula becomes smaller than the first slip ratio threshold value S1, and the basic control unit 34 selects phase-III and rapidly increases the braking pressure, whereby the wheel speed is rapidly reduced as shown by the solid line in FIG. 5.

On the other hand, when the pseudo vehicle speed Vr is not changed, the braking pressure is not sufficiently increased though the brake pedal 26 has been depressed and accordingly the wheel speed is not quickly reduced as shown by the broken line in FIG. 5, whereby the vehicle runs straight for a while.

When the anti-skid control is not being effected, or when the phase for at least one of the channels is neither phase-I nor phase-II, the pseudo vehicle speed Vr is not changed. (steps S2 and S3) Further when the phase for at least one of the channels is shifted to a phase other than phase-I and phase-II before the predetermined time T1 lapses, the pseudo vehicle speed Vr is not changed. (steps S10 and S11) Further when the difference between the maximum wheel speed MaxVw and the minimum wheel speed MinVw does not become smaller than the predetermined value ΔVo after the state where the phases for the first to third channels are all phase-I or phase-II keeps for the predetermined time T1 and the phase for at least one of the channels is shifted to a phase other than phase-I and phase-II, it may be considered, for instance, that the driver releases the brake pedal 26 after the end of the spin. In such a case, the braking pressure need not be increased. Accordingly the pseudo vehicle speed Vr is not changed. (steps S8 and S12)

Though, in the embodiment described above, the pressure increasing means 42 increases the braking pressure by causing the basic control unit 34 to reduce the pseudo vehicle speed Vr, it may increase the braking pressure by causing the basic control unit 34 to control the valve units 30, 31 and 33 to increase the braking pressure without or together with changing the pseudo vehicle speed Vr. Further the braking pressure can be increased by causing the basic control unit 34 to interrupt the anti-skid control.

What is claimed is:

1. An anti-skid brake system for a vehicle comprising a hydraulic circuit for applying braking pressure to each wheel of the vehicle in response to depression of a brake pedal, a braking pressure control means which controls the braking pressure applied to each wheel, a wheel speed detecting means which detects the rotational speeds of the wheels, a pseudo vehicle speed setting means which sets a pseudo vehicle speed on the basis of the wheel speeds, and a control means which causes the braking pressure control means to increase and reduce the braking pressure to each wheel so that the wheel speed of the wheel falls at a target deceleration according to the wheel speed of the wheel detected by the wheel speed detecting means and the pseudo vehicle speed set by the pseudo vehicle speed setting means, wherein the improvement comprises a spin determination means which determines that the vehicle is spinning when a state where the braking pressure applied to any one of the wheels is not increased for a predetermined time while said control means is causing the braking pressure control means to increase and reduce the braking pressure to each wheel so that the wheel speed of the wheel falls at the target deceleration, and a pressure increasing means which causes the braking pressure control means to increase the braking pressures to all the wheels when the spin determination means determines that the vehicle is spinning.

2. An anti-skid brake system as defined in claim 1 in which said pseudo vehicle speed setting means sets the pseudo vehicle speed to a value equal to a maximum wheel speed which is the largest of the wheel speeds of all the wheels at that time and when the deceleration of the maximum wheel speed exceeds a reference deceleration, the pseudo vehicle speed setting means sets the pseudo vehicle speed to a value obtained by subtracting the reference deceleration from the last pseudo vehicle speed, and said pressure increasing means causes the pseudo vehicle speed setting means to change the pseudo vehicle speed to the maximum wheel speed at the time when the spin determination means determines that the vehicle is spinning.

3. An anti-skid brake system as defined in claim 1 in which said pressure increasing means causes said control means to cause the braking pressure control means to increase the braking pressures to all the wheels when the spin determination means determines that the vehicle is spinning.

4. An anti-skid brake system for a vehicle comprising a hydraulic circuit for applying braking pressure to each wheel of the vehicle in response to depression of a brake pedal, a braking pressure control means which controls the braking pressure applied to each wheel, a wheel speed detecting means which detects the rotational speeds of the wheels, a pseudo vehicle speed setting means which sets a pseudo vehicle speed on the basis of the wheel speeds, and a control means which causes the braking pressure control means to increase and reduce the braking pressure to each wheel so that the wheel speed of the wheel falls at a target slip ratio according to the wheel speed of the wheel detected by the wheel speed detecting means and the pseudo vehicle speed set by the pseudo vehicle speed setting means, said slip ratio of the vehicle being calculated on the basis of the pseudo vehicle speed and being reduced as the pseudo vehicle speed decreases, wherein the improvement comprises a spin determination means which determines that the vehicle is spinning when a state where the braking pressure applied to anyone of the wheels is not increased for a predetermined time while said control means is causing the braking pressure control means to increase and reduce the braking pressure to each wheel so that the wheel speed of the wheel falls at the target slip ratio, and a pressure increasing means which causes the braking pressure control means to increase the braking pressures to all the wheel when the spin determination means determines that the vehicle is spinning and the difference between the largest and the smallest of the wheel speeds of all the wheels is smaller than a predetermined value.

5. An anti-skid brake system for a vehicle comprising a hydraulic circuit for applying braking pressure to each wheel of the vehicle in response to depression of a brake pedal, a braking pressure control means which controls the braking pressure applied to each wheel, a wheel speed detecting means which detects the rotational speeds of the wheels, a pseudo vehicle speed setting means which sets a pseudo vehicle speed on the basis of the wheel speeds, and a control means which causes the braking pressure control means to increase and reduce the braking pressure to each wheel so that the wheel speed of the wheel falls at a target deceleration according to the wheel speed of the wheel detected by the wheel speed detecting means and the pseudo vehicle speed set by the pseudo vehicle speed setting means, wherein the improvement comprises a spin determination means which determines that the vehicle is spinning when a state where the braking pressure applied to anyone of the wheels is not increased for a predetermined time while said control means is causing the braking pressure control means to increase and reduce the braking pressure to each wheel so that the wheel speed of the wheel falls at the target deceleration, and a pressure increasing means which causes the braking pressure control means to increase the braking pressures to all the wheels when the spin determination means determines that the vehicle is spinning and the difference between the largest and the smallest of the wheel speeds of all the wheels is smaller than a predetermined value.

6. An anti-skid brake system for a vehicle comprising a hydraulic circuit for applying braking pressure to each wheel of the vehicle in response to depression of a brake pedal, a braking pressure control means which controls the braking pressure applied to each wheel, a wheel speed detecting means which detects the rotational speeds of the wheels, a pseudo vehicle speed setting means which sets a pseudo vehicle speed on the basis of the wheel speeds, and a control means which causes the braking pressure control means to increase and reduce the braking pressure control means to increase and reduce the braking pressure to each wheel so that the wheel speed of the wheel falls at a target slip ratio according to the wheel speed of the wheel detected by wheel speed detecting means and the pseudo vehicle speed set by the pseudo vehicle speed setting means, said slip ratio of the vehicle being calculated on the basis of the pseudo vehicle speed and being reduced as the pseudo vehicle speed decreases, where the improvement comprises a spin determination means which determines that the vehicle is spinning when a state where the braking pressure applied to any one of the wheels is not increased for a predetermined time while said control means is causing the braking pressure control means to increase and reduce the braking pressure to each wheel so that the wheel speed of the wheel falls at the target slip ratio, and a pressure increasing means which causes the braking pressure control means to increase the braking pressures to all the wheels when the spin determination means determines that the vehicle is spinning.

7. An anti-skid brake system as defined in claim 6 in which said control means causes the braking pressure control means to increase the braking pressure to each wheel when the slip ratio of the wheel reduces to a predetermined reference value and said pressure increasing means causes the pseudo vehicle speed setting means to decrease the pseudo vehicle speed so that the slip ratio of the wheel as calculated on the basis of the decreased pseudo vehicle speed reduces to the predetermined reference value.

8. An anti-skid brake system as defined in claim 7 in which said pseudo vehicle speed setting means sets the pseudo vehicle speed to a value equal to a maximum wheel speed which is the largest of the wheel speeds of all the wheels at that time and when the deceleration of the maximum wheel speed exceeds a reference deceleration of the maximum wheel speed exceeds a reference deceleration, the pseudo vehicle speed setting means sets the pseudo vehicle speed to a value obtained by subtracting the reference deceleration from the last pseudo vehicle speed, and said pressure increasing means causes the pseudo vehicle speed setting means to change the pseudo vehicle speed to the maximum wheel speed at the time when the spin determination means determines that the vehicle is spinning.

9. An anti-skid brake system as defined in claim 6 in which said pressure increasing means causes said control means to cause the braking pressure control means to increase the braking pressures to all the wheels when the spin determination means determines that the vehicle is spinning.

* * * * *